(12) United States Patent
Sutter et al.

(10) Patent No.: US 9,008,487 B2
(45) Date of Patent: Apr. 14, 2015

(54) SPATIAL BOOKMARKING

(75) Inventors: Edward L Sutter, Fanwood, NJ (US); Hock M Ng, Westfield, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 189 days.

(21) Appl. No.: 13/312,218

(22) Filed: Dec. 6, 2011

(65) Prior Publication Data

US 2013/0141573 A1     Jun. 6, 2013

(51) Int. Cl.
| | |
|---|---|
| H04N 5/77 | (2006.01) |
| H04N 9/80 | (2006.01) |
| H04N 7/18 | (2006.01) |
| H04N 7/14 | (2006.01) |
| H04N 5/232 | (2006.01) |

(52) U.S. Cl.
CPC ............ *H04N 7/147* (2013.01); *H04N 5/23216* (2013.01); *H04N 7/183* (2013.01)

(58) Field of Classification Search
USPC .................................. 386/200–234, 239–248
See application file for complete search history.

(56) References Cited

U.S. PATENT DOCUMENTS

| | | | |
|---|---|---|---|
| 5,355,163 A | 10/1994 | Tomitaka | |
| 5,367,506 A | 11/1994 | Inanaga et al. | |
| 5,500,671 A | 3/1996 | Andersson et al. | |
| 5,572,317 A * | 11/1996 | Parker et al. | ............. 356/139.06 |
| 5,596,645 A | 1/1997 | Fujimori | |
| 5,745,161 A | 4/1998 | Ito | |
| 5,786,846 A | 7/1998 | Hiroaki | |
| 5,844,599 A | 12/1998 | Hildin | |
| 5,896,128 A | 4/1999 | Boyer | |
| 5,940,118 A | 8/1999 | Van Schyndel | |
| 5,963,250 A | 10/1999 | Parker et al. | |
| 6,005,610 A | 12/1999 | Pingali | |
| 6,021,206 A | 2/2000 | McGrath | |

(Continued)

FOREIGN PATENT DOCUMENTS

| | | |
|---|---|---|
| EP | 1643769 A1 | 4/2006 |
| WO | WO9306690 | 4/1993 |

(Continued)

OTHER PUBLICATIONS

PCT International Search Report corresponding to PCT Application No. PCT/US2012/066511, filed Nov. 26, 2012, International Search Report issued Feb. 19, 2013, pp. 1-4.

(Continued)

*Primary Examiner* — Hung Dang
(74) *Attorney, Agent, or Firm* — Wolff & Samson PC

(57) ABSTRACT

Methods, apparatuses and computer-readable media for creating a spatial bookmark are provided. A method includes performing an action at a near location which causes a spatial bearing parameter corresponding to a real-time video image captured by a video-camera platform at a remote location to be stored in a computer-readable memory, wherein the video-camera platform has a controllable LOS. Performing an action at the near location that designates to a computer an image displayed on a screen, wherein the image is representative of the real-time video image, thereby causing the computer to retrieve the spatial bearing parameter from the computer-readable memory, and performing an action causing the computer to aim the video-camera platform along a LOS, wherein the video-camera platform captures a real-time video image that is received at a screen for display at the near location.

17 Claims, 8 Drawing Sheets

(56) References Cited

U.S. PATENT DOCUMENTS

| | | | |
|---|---|---|---|
| 6,072,522 A | 6/2000 | Ippolito et al. | |
| 6,122,005 A | 9/2000 | Sasaki et al. | |
| 6,137,485 A | 10/2000 | Kawai et al. | |
| 6,239,838 B1 | 5/2001 | Lee et al. | |
| 6,266,082 B1 | 7/2001 | Yonezawa et al. | |
| 6,275,258 B1 | 8/2001 | Chim | |
| 6,313,875 B1 | 11/2001 | Suga et al. | |
| 6,318,825 B1 | 11/2001 | Carau, Sr. | |
| 6,385,352 B1 | 5/2002 | Roustaei | |
| 6,487,600 B1 | 11/2002 | Lynch | |
| 6,593,956 B1 | 7/2003 | Potts et al. | |
| 6,628,887 B1* | 9/2003 | Rhodes et al. | 386/230 |
| 6,714,236 B1* | 3/2004 | Wada et al. | 348/152 |
| 6,766,035 B1 | 7/2004 | Gutta | |
| 6,772,195 B1 | 8/2004 | Hatlelid et al. | |
| 7,035,418 B1 | 4/2006 | Okuno et al. | |
| 7,039,221 B1 | 5/2006 | Tumey et al. | |
| 7,111,045 B2 | 9/2006 | Kato et al. | |
| 7,151,558 B1* | 12/2006 | Kogane et al. | 348/151 |
| 7,202,889 B2 | 4/2007 | Suzuki et al. | |
| 7,221,386 B2 | 5/2007 | Thacher et al. | |
| 7,271,827 B2 | 9/2007 | Nister | |
| 7,283,788 B1 | 10/2007 | Posa et al. | |
| 7,330,607 B2 | 2/2008 | Jung et al. | |
| 7,512,883 B2 | 3/2009 | Wallick et al. | |
| 7,626,569 B2 | 12/2009 | Lanier | |
| 7,840,903 B1 | 11/2010 | Amidon et al. | |
| 7,880,739 B2 | 2/2011 | Long et al. | |
| 7,913,176 B1 | 3/2011 | Blattner et al. | |
| 7,987,309 B2 | 7/2011 | Rofougaran | |
| 7,995,090 B2 | 8/2011 | Liu et al. | |
| 8,111,282 B2 | 2/2012 | Cutler et al. | |
| 8,125,444 B2 | 2/2012 | Norager | |
| 8,150,063 B2 | 4/2012 | Chen et al. | |
| 8,156,184 B2 | 4/2012 | Kurata et al. | |
| 8,264,522 B2 | 9/2012 | Martin et al. | |
| 8,355,040 B2 | 1/2013 | Trachtenberg et al. | |
| 8,380,550 B2 | 2/2013 | Mattimore et al. | |
| 8,397,168 B2 | 3/2013 | Leacock et al. | |
| 8,411,128 B2 | 4/2013 | Kang | |
| 8,411,165 B2 | 4/2013 | Ozawa | |
| 8,451,994 B2 | 5/2013 | Abuan et al. | |
| 8,547,416 B2 | 10/2013 | Ozawa | |
| 8,584,026 B2 | 11/2013 | Lynk et al. | |
| 2002/0039111 A1 | 4/2002 | Gips et al. | |
| 2002/0072993 A1 | 6/2002 | Sandus et al. | |
| 2002/0149672 A1 | 10/2002 | Clapp et al. | |
| 2002/0181955 A1* | 12/2002 | Hsieh | 396/419 |
| 2003/0081115 A1 | 5/2003 | Curry et al. | |
| 2003/0206232 A1 | 11/2003 | Suzuki et al. | |
| 2004/0003409 A1 | 1/2004 | Berstis | |
| 2004/0189701 A1 | 9/2004 | Badt | |
| 2004/0233282 A1 | 11/2004 | Stavely et al. | |
| 2004/0257432 A1 | 12/2004 | Girish et al. | |
| 2005/0007445 A1 | 1/2005 | Foote et al. | |
| 2005/0062869 A1 | 3/2005 | Zimmermann et al. | |
| 2005/0280701 A1 | 12/2005 | Wardell | |
| 2005/0285950 A1* | 12/2005 | Oya | 348/211.4 |
| 2006/0007222 A1 | 1/2006 | Uy | |
| 2006/0077252 A1 | 4/2006 | Bain et al. | |
| 2006/0152487 A1 | 7/2006 | Grunnet-Jepsen et al. | |
| 2007/0002130 A1 | 1/2007 | Hartkop | |
| 2007/0075965 A1 | 4/2007 | Huppi et al. | |
| 2007/0120879 A1 | 5/2007 | Kanade et al. | |
| 2007/0263824 A1 | 11/2007 | Bangalore et al. | |
| 2007/0273839 A1 | 11/2007 | Doi et al. | |
| 2008/0012936 A1 | 1/2008 | White | |
| 2008/0063389 A1 | 3/2008 | Fang et al. | |
| 2008/0086696 A1 | 4/2008 | Sri Prakash et al. | |
| 2008/0170123 A1 | 7/2008 | Albertson et al. | |
| 2008/0211915 A1 | 9/2008 | McCubbrey | |
| 2009/0041298 A1 | 2/2009 | Sandler et al. | |
| 2009/0111518 A1 | 4/2009 | Agrawal et al. | |
| 2009/0119736 A1 | 5/2009 | Perlman et al. | |
| 2009/0122572 A1 | 5/2009 | Page et al. | |
| 2009/0141147 A1 | 6/2009 | Alberts et al. | |
| 2009/0153474 A1 | 6/2009 | Quennesson | |
| 2009/0202114 A1 | 8/2009 | Morin et al. | |
| 2009/0210804 A1 | 8/2009 | Kurata et al. | |
| 2009/0216501 A1 | 8/2009 | Yeow et al. | |
| 2009/0309956 A1 | 12/2009 | Hawkins et al. | |
| 2009/0315984 A1 | 12/2009 | Lin et al. | |
| 2010/0073454 A1 | 3/2010 | Lovhaugen et al. | |
| 2010/0073456 A1 | 3/2010 | Bolle | |
| 2010/0128892 A1 | 5/2010 | Chen et al. | |
| 2010/0188473 A1 | 7/2010 | King et al. | |
| 2010/0262718 A1 | 10/2010 | Ikeno et al. | |
| 2010/0285879 A1 | 11/2010 | Huang et al. | |
| 2010/0293468 A1 | 11/2010 | Thijssen | |
| 2010/0302343 A1 | 12/2010 | Bolle | |
| 2010/0309117 A1 | 12/2010 | Ohta | |
| 2010/0328423 A1 | 12/2010 | Etter | |
| 2011/0149012 A1 | 6/2011 | Bolle et al. | |
| 2011/0170256 A1 | 7/2011 | Lee | |
| 2011/0181507 A1 | 7/2011 | Oakley | |
| 2011/0254914 A1 | 10/2011 | Ng | |
| 2011/0267421 A1 | 11/2011 | Sutter, Jr. | |
| 2011/0268263 A1 | 11/2011 | Jones et al. | |
| 2012/0011454 A1 | 1/2012 | Droz et al. | |
| 2012/0036181 A1 | 2/2012 | Isidore | |
| 2012/0069218 A1 | 3/2012 | Gantman | |
| 2012/0081504 A1 | 4/2012 | Ng et al. | |
| 2012/0083314 A1 | 4/2012 | Ng et al. | |
| 2012/0098921 A1 | 4/2012 | Stedman et al. | |
| 2012/0154510 A1 | 6/2012 | Huitema et al. | |
| 2012/0204120 A1 | 8/2012 | Lefar et al. | |
| 2012/0216129 A1 | 8/2012 | Ng et al. | |
| 2013/0141573 A1 | 6/2013 | Sutter et al. | |
| 2013/0314543 A1 | 11/2013 | Sutter et al. | |

FOREIGN PATENT DOCUMENTS

| | | |
|---|---|---|
| WO | 0182626 A1 | 11/2001 |
| WO | 0186953 A1 | 11/2001 |

OTHER PUBLICATIONS

PCT Written Opinion of the International Search Authority corresponding to PCT Application No. PCT/2012/066511, filed Nov. 26, 2012, International Search Report issued Feb. 19, 2013.

Swivl Web Page, downloaded May 7, 2012; www.swivl.com, 3 pages.

Swivl Blog Post dated Dec. 28, 2010, www.swivl.com/2010/12/why-a-video-accessory/, 2 pages.

Swivl Blog Post dated Dec. 22, 2010, www.swivl.com/2010/12/live-on-indiegogo/, 2 pages.

Travis Deyle—IRobot Ava Telepresence Robot at CES 2011—5 pages—hizook.com, Jan. 6, 2011—www.hizook.com/blog/2011/01/06/irobot-ava-telepresence-robot-ces-2011-one-step-closer-robot-app-stores.

CISCO Webex, "What is Webex?" https://web.archive.org/web/20110101032216/http://www.webex.com/what-is-webex/index.html, downloaded Jan. 24, 2014, 2 pages.

"HP SkyRoom Version 1 (Quanity 500) Node-locked E-LTU Software (VK634AAE)—Specifications and Warranty," Hewlett Packard, http://h10010.www.1.hp.com/wwpc/us/en/sm/WF06b/18964-18964-4020068-4020071-4020069-4020938-4026194-4026196.html?dnr=2, downloaded Jan. 24, 2014, 2 pages.

Gross, M., et al., "blue-c: A Spatially Immersive Display and 3D Video Portal for Telepresence," http://blue.ethz.ch/ACM 0730-0301/03/0700-0819, 2003, pp. 829-827.

Iizadi, S., et al., "Going beyond the Display: A Surface Technology with an Electronically Switchable Diffuser," UIST '08, Oct. 19-22, 2008, Monterey, California, pp. 269-278.

Ishii, H., et al., "ClearBoard: A Seamless Medium for Shared Drawing and Conversation with Eye Contact," CHI '92, May 3-7, 1992, pp. 525-532.

Kuechler, M., et al., "HoloPort—A Device for Simultaneous Video and Data Conferencing Featuring Gaze Awareness," IEEE Virtual Reality Conference (VR'06) IEEE Computer Society, Mar. 25-29, 2006, pp. 81-88.

(56) References Cited

OTHER PUBLICATIONS

Lo, D., "Multimodal Talker Localization in Video Conferencing Environments," The 3rd IEEE International Workshop on Haptic, Audio and Visual Environments and their Applications, 2004 (HAVE '04), Oct. 2-3, 2004, pp. 195-200.

NEC Display Solutions, "CRV43 Curved Ultra-Wide Display," http://www.necdisplay.com/newtechnologies/curveddisplayl, Apr. 12, 2010, 2 pages.

Polycom, Polycom CX 5000 Video Collarboration Device-Products-Polycom, http://www.polycom.com/products/voice/conferencing_solutions/microsft_optimized_conferencing/cx5000.html, Apr. 12, 2010, 1 page.

Shiwa, S., et al., "A Large-Screen Visual Telecommunication Device Enabling Eye Contact," SID 91 Digest, 1991, pp. 327-328.

Tan, K., et al., "ConnectBoard: A Remote Collaboration System that Supports Gaze-Aware Interaction and Sharing," 2009 IEEE International Workshop on Multimedia Signal Processing, (MMSP '09) Oct. 5-7, 2009, 6 pages.

Lance Ulanoff—I'Robot's AVA is an App-Ready Robot—2 pages—pcmag.com, Jan 6, 2011—www.pcmag.com/article2/0,2817,2375313,00.asp.

Web Conferencing & Online Meetings Overview: WebEx; http://www.webex.com/what-is-webes/index.html, printed on Feb. 22, 2011.

"Method and Apparatus for Two-Way Multimedia Communications," U.S. Appl. No. 12/770,991, filed Apr. 30, 2010.

"Immersive Viewer, A Method of Providing Scenes on a Display and an Immersive Viewing System," U.S. Appl. No. 12/759,823, filed Apr. 14, 2010.

Bolle, U.S. Appl. No. 12/238,096; "Videoconferencing Terminal and Method of Operation Thereof to Maintain Eye Contact," filed Sep. 25, 2008.

Bolle, U.S. Appl. No. 12/472,250; "Videoconferencing Terminal and Method of Operation Thereof to Maintain Eye Contact," filed May 26, 2009.

Bolle, U.S. Appl. No. 12/640,998; "Videoconferencing Terminal With a Persistance of Vision Display and Method of Operation Thereof to Maintain Eye Contact," filed Dec. 17, 2009.

C. Bolle et al., "Imaging Terminal," Filed Dec. 8, 2009, U.S. Appl. No. 12/633,429, 21 pages.

International Search Report and Written Opinion mailed on Dec. 3, 2014, in connection with related international patent application No. PCT/US2013/48070, 8 pgs.

\* cited by examiner

SPATIAL BOOKMARKING

TECHNICAL FIELD

This specification relates generally to video-conferencing control applications, and more particularly to methods for directing a video-camera platform to aim along selected lines-of-sight.

BACKGROUND

Video-conferencing allows virtual participants, who are at a location that is remote from a meeting room, to view real-time video images of a meeting. However, these virtual participants usually do not have control over the real-time video images they receive. For example, virtual participants generally cannot direct the video-camera at the remote location to aim along a particular line-of-sight to place particular objects or people within the camera's field-of-view.

While providing the video-camera with a wider field-of-view may provide a way to capture more of the meeting room within a particular frame, there is always a wider view than will be supported by a video-camera. As such, it is likely that at least some elements of the meeting room will not be constantly visible in a real-time video image. Further, wide-angle lenses may introduce image distortion that, unless corrected by software that requires additional computational resources, can make certain elements within real-time video images unclear.

In an alternative solution, video-cameras may be automatically aimed upon detecting motion, or the sound of a voice or object within a meeting room. These solutions typically require a controller to aim a video-camera along selected lines-of-sight. However, this type of controller is usually situated at the same location as the video-camera and the motion/sound source (e.g., within or adjacent to the meeting room) and is generally not accessible to virtual participants.

SUMMARY

Methods, apparatuses and computer-readable media for creating and utilizing a spatial bookmark are presented. In an embodiment, a method for controlling, from a near location, the view of a video-camera platform located at a remote location based on a spatial bookmark is provided. A user at the near location who is in communication with a video-camera platform at a remote location can aim the video-camera platform along a line-of-sight (LOS) associated with a spatial bookmark (e.g., toward saved locations of interest) by selecting an image presented on a screen that is representative of objects or persons at the remote location.

In accordance with an embodiment, an action is performed at a near location which causes a spatial bearing parameter corresponding to a real-time video image captured by a video-camera platform at a remote location to be stored in a computer-readable memory, wherein the video-camera platform has a controllable LOS. An action is performed at the near location that designates to a computer an image displayed on a screen, wherein the image is representative of the real-time video image, thereby causing the computer to retrieve the spatial bearing parameter from the computer-readable memory, and an action is performed causing the computer to aim the video-camera platform along a LOS, wherein the video-camera platform captures a real-time video image that is received at a screen for display at the near location. The spatial bearing parameter may comprise at least one of a pan coordinate and a tilt coordinate.

In accordance with an embodiment, the video-camera platform may be in communication with a robotic device at the remote location, and the action causing the computer to aim the video-camera platform along the LOS causes the robotic device to perform an action based on a real-time video image captured by the video-camera platform. The video-camera platform may also be in communication with a computer application, wherein the action causing the computer to aim the video-camera platform along the selected LOS causes the computer application to perform an action based on a real-time video image captured by the video-camera platform.

In accordance with an embodiment, the spatial bearing parameter is automatically determined based on one of a detected sensor signal at the remote location or user-selected scanning criteria.

In accordance with an embodiment, information indicative of spatial bearing parameter is caused to be stored in the computer-readable memory, and the information indicative of the spatial bearing parameter is caused to be transmitted, wherein the information indicative of the spatial bearing parameter causes the video-camera platform to aim along the LOS.

In accordance with an embodiment, an index of information indicative of a spatial bearing parameter is stored upon user-selection, and the index is transmitted along with an instruction to record the corresponding spatial bearing parameter. The index is transmitted upon the designation of the selected image that corresponds to the spatial bearing parameter of the LOS to the remote location.

In accordance with an embodiment, a spatial bearing parameter is stored at the near location upon user-selection, and is transmitted to the remote location upon the designation of the selected image. Control signals also may be transmitted from the near location for aiming the video-camera platform along the LOS.

In accordance with an embodiment, real-time video images captured by a video-camera platform at a remote location are displayed at a near location, wherein the video-camera platform has a controllable LOS. While displaying the real-time video images, one or more user-generated inputs are received at respective view-selection times. A spatial bearing parameter of the video-camera platform obtained at each respective view-selection time is recorded in response to the respective user-generated inputs. Images representative of the real-time video images are displayed at each view-selection time, and in response to at least one user-generated input that designates a selected one of the images, the video-camera platform is automatically aimed along a LOS corresponding to the spatial bearing parameter.

These and other advantages of the present disclosure will be apparent to those of ordinary skill in the art by reference to the following detailed description and the accompanying drawings.

DETAILED DESCRIPTION

Figure 1:
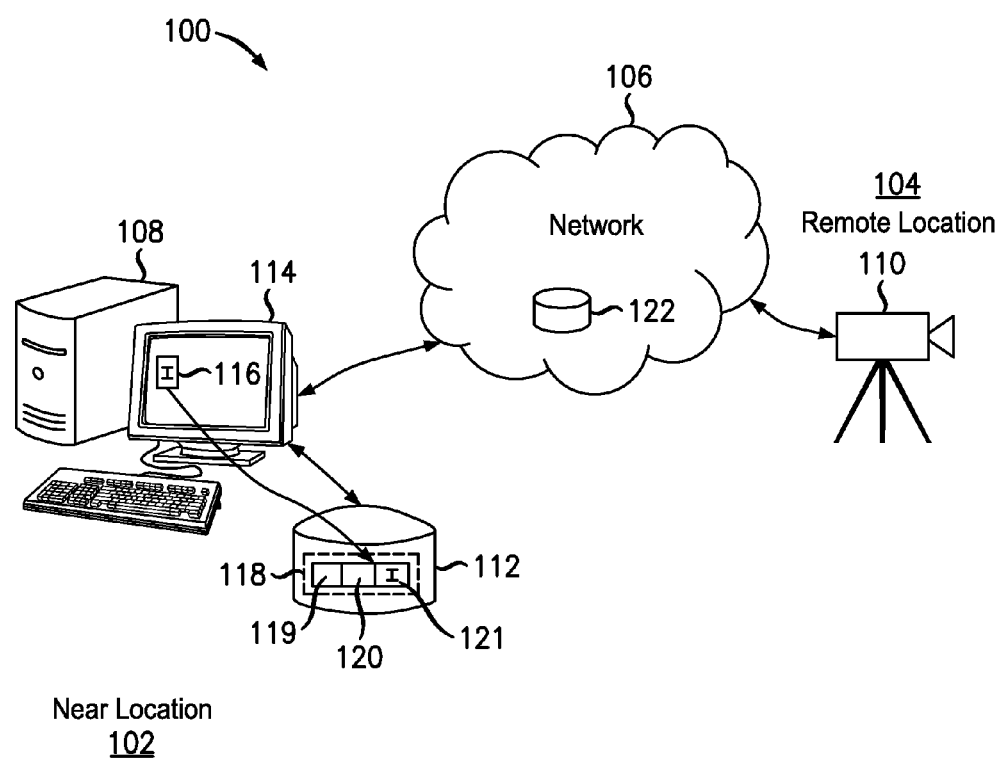
FIG. 1 is a diagram of a networked computing system for creating and utilizing a spatial bookmark in accordance with an embodiment.

A video-camera platform can be utilized to establish a virtual meeting (i.e., a video-conference) between two locations that are remote (e.g., not within a line-of-sight) from each other. As such, virtual meeting participants, who are at a first (near) location, can view real-time video images of a meeting taking place at a second (remote) location. The embodiments herein allow a user (e.g., a virtual meeting participant) at a near location to view real-time video images produced by a video-camera platform at a remote location and to create spatial (i.e., physical space) bookmarks based on the real-time video images.

A spatial bookmark (also referred to herein as a bookmark) can be used to mark and recall an area of physical space, such as an area of physical space presented in a field-of-view of a real-time video image. A bookmark can be defined based on a coordinate system, such as by Cartesian coordinates or by a pan coordinate (corresponding to a rotation about a vertical axis) and a tilt coordinate (corresponding to a rotation about a horizontal axis). For example, a pan and tilt (p, t) coordinate pair can represent pan and tilt angles referenced to a fixed home position of a video-camera platform. As such, a bookmark may comprise a spatial bearing parameter, such as a reference to a pan and tilt coordinate pair, as well as other video-camera platform control data (e.g., focus, zoom, light settings, etc.). A bookmark can be transmitted to direct a video-camera platform to aim along a line-of-sight corresponding to a spatial bearing parameter (e.g., pan and tilt coordinate pair) of the bookmark. Further, the video-camera platform may be additionally directed based on the control data of the bookmark. As such, a user at a near location can perform an action that causes a video-camera platform at a remote location to be aimed along a particular line-of-sight (LOS). Therefore, creating a bookmark may overcome the need to locally or manually aim a video-camera platform based on a particular area of interest.

Areas of physical space (spatial locations), as viewed from the perspective of a video-camera platform, that include participants and objects of interest within a meeting room may be saved as bookmarks. For example, several meeting participants may be seated around tables and other objects of interest, such as projector screens and whiteboards. Real-time video images produced by a video-camera platform within the meeting room (at a remote location) can be presented on a screen at a near location. In one embodiment, these real-time video images can be presented on the screen as one or more still images or as a short motion-video clip that may show an approximation of what would be seen in a real-time video image. In another embodiment, one or more icons representing a participant or object of interest located within the field-of-view of a real-time video image can be generated and presented on the screen. Upon presentation, each of the real-time video images, still images and icons can be selected by a user to create a bookmark that can be recorded and utilized to automatically aim the video-camera platform along a LOS corresponding to a spatial bearing parameter (e.g., the pan and tilt coordinate pair) of the bookmark.

FIG. 1 is a diagram of a networked computing system for creating and utilizing a spatial bookmark in accordance with an embodiment. System 100 defines a near location 102 and a remote location 104. Near location 102 defines a location that is at a physical distance from remote location 104 (e.g., a location that is not within the line-of-sight of remote location 104 such as a different meeting room, city or country). For example, remote location 104 may be a location of a live conference that is transmitted via network 106 to near location 102.

Network 106 can be a public network (e.g., the Internet), a private network (e.g., and enterprise intranet) or a combination of public and private networks. As such, one or more interconnected components of network 106 can include both public network components (e.g., public data centers) and private network components (e.g., enterprise data centers). For example, network 106 may comprise one or more interconnected data nodes, backend components and computer terminals, such as computer terminal 108.

System 100 further includes a video-camera platform 110 (e.g., a pan/tilt platform) that can support controllable pan/tilt motion and/or mobility. For example, a video-camera platform may include a conventional pan/tilt video-camera, a network-connected video-camera, a video-camera mounted on a mobile robotic platform, or the like. As such, a video-camera platform can be understood to include any combination of a video-camera and circuitry for various applications. Further, while a video-camera platform implementation is exemplary, it also should be noted that other devices, robots and computer applications associated with video or fixed-frame cameras are equally suitable for implementing the various embodiments.

Computer terminal 108, in combination with computer-readable memory 112, may be configured to execute a controller procedure to allow a user at a near location to create a spatial bookmark based on images received from a video-camera platform 110 at a remote location. For example, display screen 114 at near location 102 may be configured to present for selection a real-time video image 116 (or, alternatively, a still image or icon representing a real-time video image) received from video-camera platform 110. Upon selection of real-time video image 116 by a user, a bookmark 118 constituting a spatial bearing parameter 119 (e.g., a reference to a pan and tilt coordinate pair of image 116) and, optionally, additional data 120 (e.g., control data associated with image 116 such as camera focus settings, aperture settings, etc.) and a representation (I') 121 of image 116 (e.g., a thumbnail image), may be stored locally in memory 112 or transmitted via network 106 for storage, such as in a cloud computing storage node 122. Upon storage of bookmark 118, computer terminal 108, in combination with computer-readable memory 112 (or cloud computing storage node 122), may be configured to execute a controller procedure to retrieve the bookmark 118 and effectively allow a user at near location 102 to automatically aim video-camera platform 110 along a LOS corresponding to the spatial bearing parameter 119 of bookmark 118.

Figure 2:
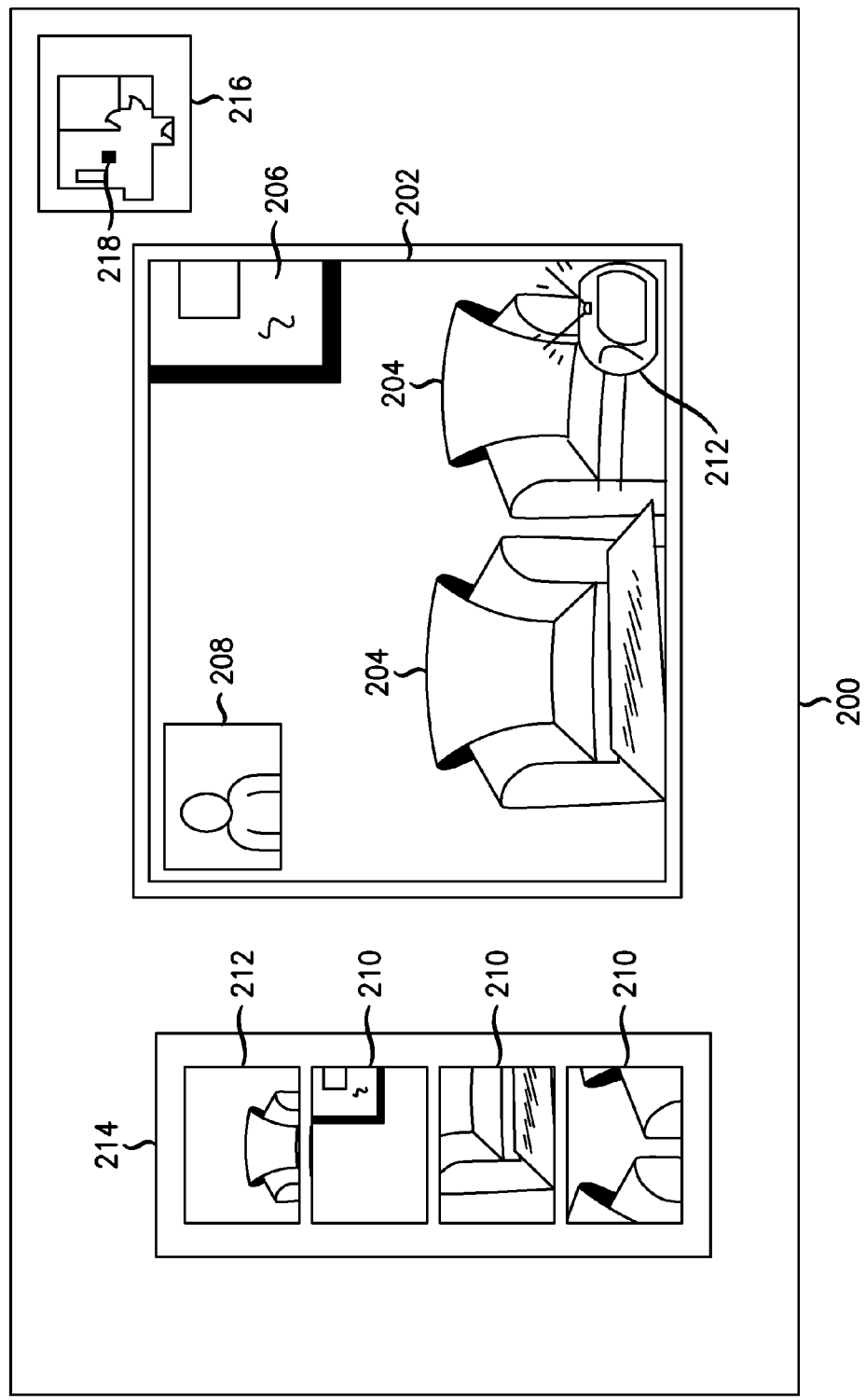
FIG. 2 is a diagram of a user-interface screen in accordance with an embodiment.

FIG. 2 is a diagram of a user-interface screen in accordance with an embodiment. Computer terminal 108, in conjunction with computer-readable memory 112, may be configured to execute a graphical user interface application (GUI) 200 at display 114 for controlling video-camera platform 110 at remote location 104. In one embodiment, GUI 200 allows a user at near location 102 to create a spatial bookmark. For example, GUI 200 may display a real-time video image 202 of remote location 104 (e.g., a meeting room having chairs 204, a display monitor 206, etc.) and, optionally, a display of near location 102 (e.g., picture-in-picture display 208). GUI 200 may receive one or more user-generated inputs at respective view-selection times (i.e., when real-time video images of particular fields-of-view are displayed). In response to the respective user-generated inputs obtained at each respective view-selection time, one or more spatial bookmarks including one or more spatial bearing parameters 119 and, optionally, additional data 120 can be created and then recorded (e.g., by computer terminal 108, in conjunction with computer-readable memory 112). Images 210 representative of the bookmarked real-time video images or icons 212 representing a participant or object of interest located within the field-of-view of a bookmarked real-time video image, may then be displayed and, in response to at least one user-generated input that designates a selected one of the images 210 or icons 212, video-camera platform 110 can be automatically aimed along a LOS corresponding to a spatial bearing parameter 119 of the bookmarked real-time video image represented by the selected image 210 or icon 212.

In one embodiment, GUI 200 may include a side window display area 214 for organizing a plurality of images 210 or icons 212. As such, a user may select an image 210 or icon 212 representative of a bookmarked real-time video image by clicking or touching (e.g., via a computer mouse or touch-sensitive interface) an image 210 or icon 212 within the side window display area 214 or by selecting an image 210 or icon 212 using a gesture recognized by the camera. Likewise, user may select an icon 212 overlaying the real-time video image 202 by clicking or touching an icon 212 within the image display area. In one embodiment, the user also may select to overwrite the images with new images.

In one embodiment, upon transmission of a user-selection to video-camera platform 110, video-camera platform 110 can be automatically aimed along a LOS corresponding to a spatial bearing parameter 119 of the bookmarked real-time video image represented by the selected image 210 or icon 212. For example, a computer, at near location 102, remote location 104 or elsewhere (e.g., within network 106) may transmit the spatial bearing parameter 119 and, optionally, control signals 120 of the bookmarked real-time video image to video-camera platform 110. Upon receiving the spatial bearing parameter 119 and control signals 120, video-camera platform 110 is directed to aim along a LOS corresponding to a spatial bearing parameter 119. The real-time images from video-camera platform 110 then may be received for display within GUI 200.

Alternatively, a sensor configured to be sensitive based on motion, sound, pressure, visual or other parameters may be utilized for automatically creating a spatial bookmark. For example, one or more chairs in a meeting room may be equipped with pressure (i.e., force) sensors configured to detect occupancy. A sensor-equipped chair may detect when it is occupied and automatically direct video-camera platform 110 to aim along a line-of-sight in the direction of the occupied chair. The real-time video images then may be relayed to GUI 200 for display, and a user-generated input may be received that designates a selected one of the real-time video images to create a spatial bookmark. In one embodiment, GUI 200 may present a virtual map 216 of remote location 104 in addition to the real-time video images. Virtual map 216 can be diagram including the physical space shown in real-time video images, wherein a highlighted chair 218 may indicate that a chair within the real-time video image is occupied. A spatial bookmark then may be automatically or manually created based on the virtual map information. As such, when a person stands up and moves to sit on a different chair, a new position is sensed and the video-camera platform at the remote location may be configured to aim along a LOS based on the new position. In a meeting room setting, all occupied chairs may be sensed and automatically presented to be configured as spatial bookmarks. These spatial bookmarks then may be automatically updated during the course of a video-conference session, such as when some people get up and leave the room or new people enter the room and take a seat. For example, video-camera platform 110 may be directed to face only the occupied chairs based on the automatically updated spatial bookmarks.

Figure 3A:
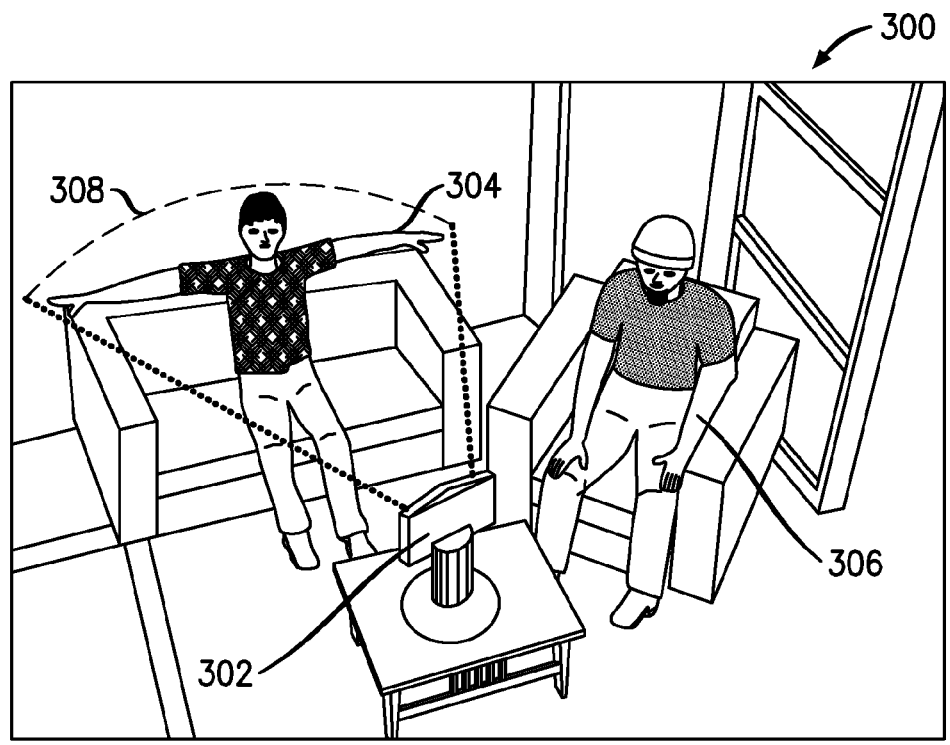
FIG. 3A illustrates a video-camera platform at a remote location meeting session in accordance with an embodiment.
Figure 3B:
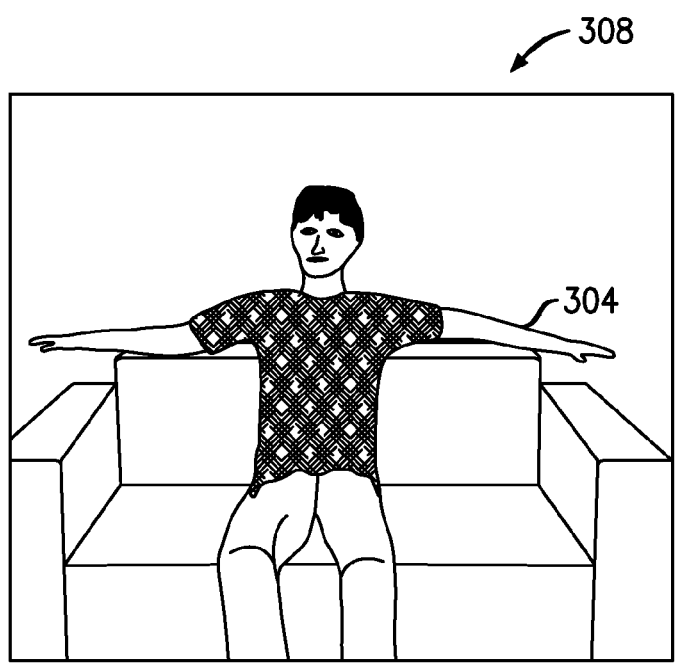
FIG. 3B illustrates a camera perspective field-of-view at a remote location meeting session in accordance with an embodiment.

FIGS. 3A-3E are diagrams illustrating video-camera platform and camera perspective fields-of-view at a remote location meeting session in accordance with an embodiment. For example, FIG. 3A illustrates a meeting room 300 at a remote location including a video-camera platform 302 through which a user at a near location connected to a network may view a meeting session. Within room 300, one or more participants, e.g., participant A 304 and participant B 306, may be seated within a first line-of-sight 308 of video-camera platform 302. Video-camera platform 302 may be controllably adjusted via GUI 200 to aim along a line-of-sight to produce real-time video images incorporating field-of-view 308. For example, field-of-view 308 may correspond to a spatial bearing parameter 119 of a bookmarked real-time video image that incorporates participant A 304. The video-camera platform perspective of field-of-view 308 is shown in FIG. 3B.

Figure 3C:
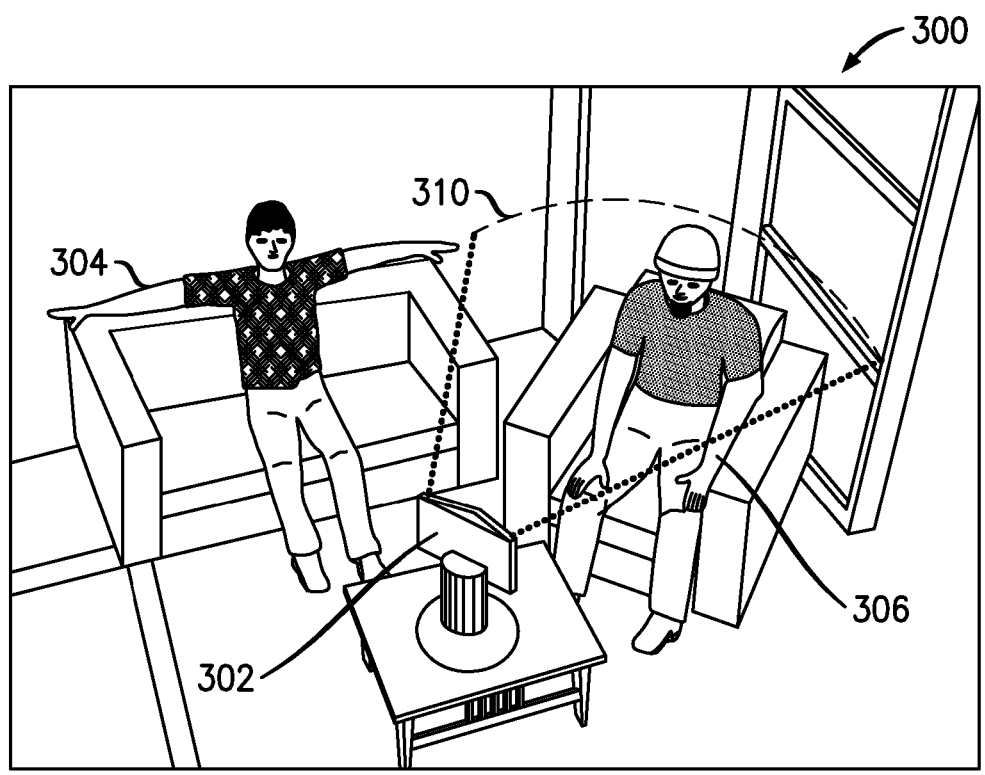
FIG. 3C illustrates another video-camera platform at a remote location meeting session in accordance with an embodiment.
Figure 3D:
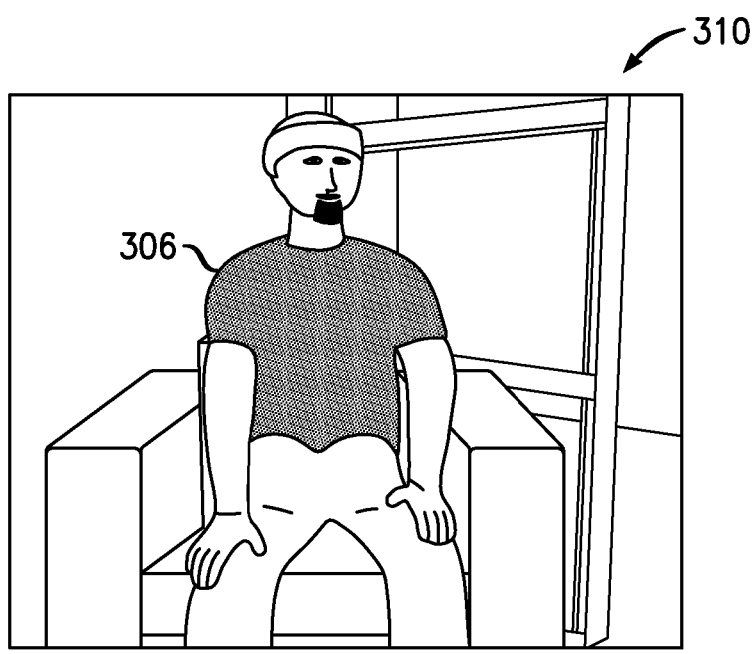
FIG. 3D illustrates another camera perspective field-of-view at a remote location meeting session in accordance with an embodiment.
Figure 3E:
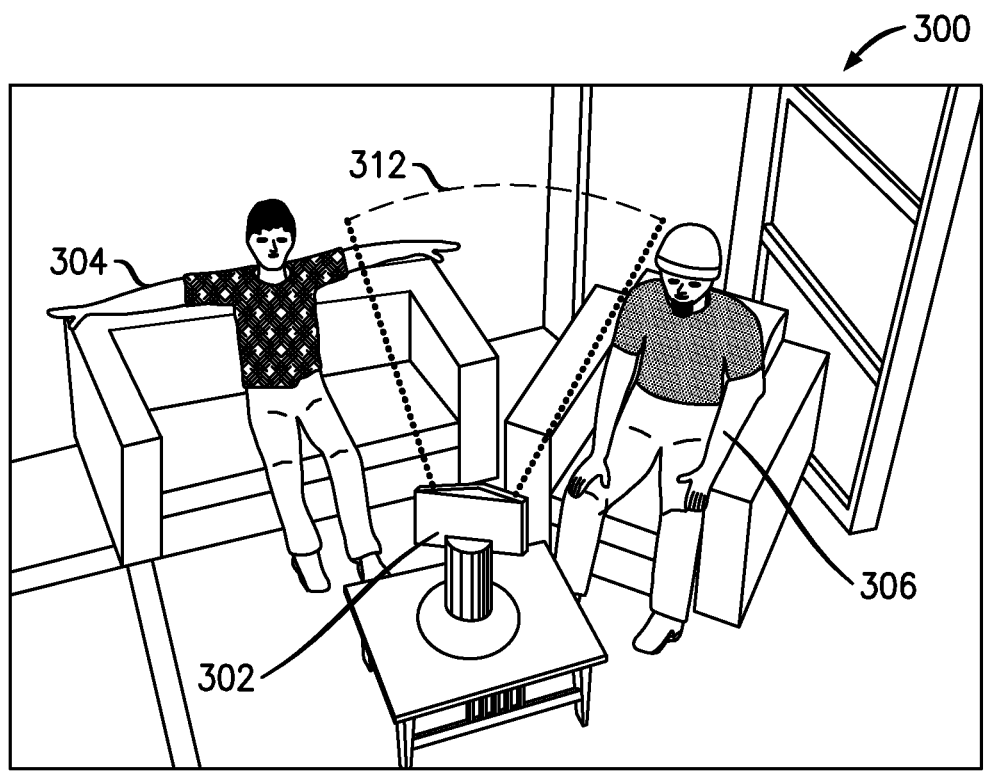
FIG. 3E illustrates another video-camera platform at a remote location meeting session in accordance with an embodiment.

Likewise, as illustrated in FIG. 3C, video-camera platform 302 may be controllably adjusted to aim along a second line-of-sight to produce real-time video images incorporating field-of-view 310. For example, field-of-view 310 may correspond to a spatial bearing parameter 119 of a bookmarked real-time video image that incorporates participant B 306. The video-camera platform perspective of field-of-view 310 is shown in FIG. 3D. While the participants in FIGS. 3A and 3C are within the fields-of-view of video-camera platform 302, FIG. 3E illustrates an instance where the participants are not visible within a field-of-view. For example, when video-camera platform 302 is aimed along a line-of-sight to produce real-time video images incorporating field-of-view 312, the field-of-view is not wide enough to view participant A 302 and participant B 306 in the frame. As such, a user may utilize spatial bookmarks created based on the camera perspectives shown in FIGS. 3B and 3D to automatically pan video-camera platform 302 from side-to-side to see each of the participants, such as during the course of a conversation.

Figure 4:
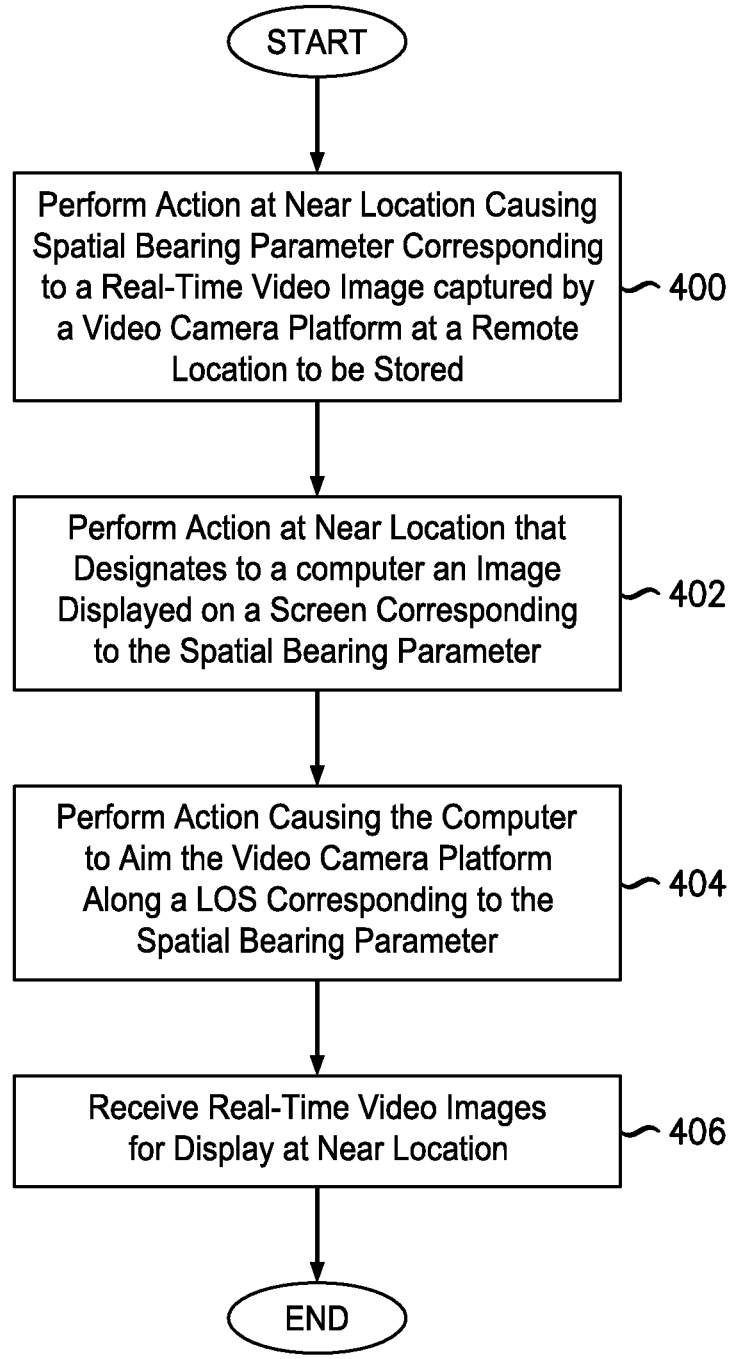
FIG. 4 is a flowchart of a process for creating and utilizing a spatial bookmark associated with a real-time video image of a remote video-camera platform in accordance with an embodiment.

FIG. 4 is a flowchart of a process for creating and utilizing a spatial bookmark associated with a real-time video image of a remote video-camera platform in accordance with an embodiment. At 400, an action is performed at a near location which causes a spatial bearing parameter corresponding to a real-time video image captured by a video-camera platform at a remote location to be stored in a computer-readable memory, wherein the video-camera has a controllable LOS. For example, a spatial bookmark may be created and stored that includes the spatial bearing parameter and optionally, one or more control signals. The spatial bearing parameter may be a pan and tilt coordinate pair.

Figure 5:
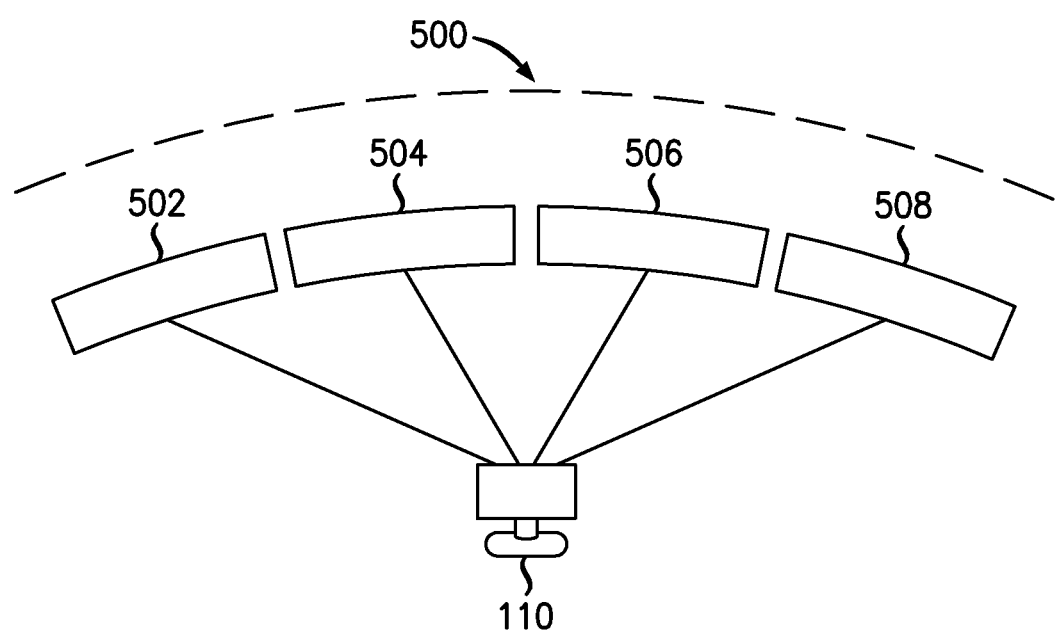
FIG. 5 is a diagram illustrating automatically created spatial bookmarks in accordance with an embodiment.

In one embodiment, the spatial bearing parameter may be automatically determined based on user-selected scanning criteria. For example, computer terminal 108 may be configured to transmit control signals to video-camera platform 110 to scan a specified angular range of motion and automatically create a specified number of spatial bookmarks within the scanned angular range of motion. As shown in FIG. 5, a user via GUI 200 may specify an angular range of motion 500 (e.g., a pan or tilt angle of 180 degrees) for scanning and a number of divisions 502-508 within the angular range of motion 500 to automatically create spatial bookmarks. For example, the specified angular range of motion and number of divisions may be transmitted to video-camera platform 110 at the remote location for auto-creation.

At 402, an action is performed at the near location that designates to a computer an image displayed on a screen, wherein the image corresponds to the spatial bearing parameter, thereby causing the computer to retrieve the spatial bearing parameter from the computer-readable memory. For example, a user at GUI 200 may click or touch a bookmarked real-time video image (created upon the action at 400) to designate the image to computer terminal 108.

At 404, an action is performed causing the computer to aim the video-camera platform along a LOS corresponding to the spatial bearing parameter, wherein the video-camera platform captures real-time video images that may be received at a screen for display at the near location at 406. Further, a user may select a bookmarked image or icon to aim a remote location video-camera along a LOS, or may manually adjust the spatial bearing parameter of one or more bookmarked images. For example, a user may adjust the spatial bearing parameter of a bookmarked real-time video image based on a real-time video image received from the video-camera platform for display at a near location.

Alternatively, the video-camera may be in communication with a mobile robotic device at the remote location, and performing the action causing the computer to aim the video-camera along a LOS at 404 may cause the mobile robotic device to perform an action based on the captured field-of-view. In another example, the video-camera may be in communication with a computer application, wherein performing the action at 404 causes the computer to aim the video-camera along a LOS causes the computer application to perform an action based on the captured field-of-view.

A spatial bearing parameter may be stored in any combination of near and remote locations relative to the video-camera platform. For example, information indicative of the spatial bearing parameter may be caused to be stored in a computer-readable memory at a near location relative to a video-camera located at a remote location. Upon user-selection, the information indicative of the spatial bearing parameter is caused to be transmitted, wherein the information indicative of the spatial bearing parameter causes the video-camera to aim along a LOS.

In another example, an index of information indicative of a spatial bearing parameter is stored upon user-selection at a near location, and the index is transmitted along with an instruction to record a corresponding spatial bearing parameter to a remote location (e.g., the location of the video-camera platform). For example, the index may be transmitted upon the designation of a bookmarked image that corresponds to the spatial bearing parameter.

In yet another example, a spatial bearing parameter may be stored at the near location upon user-selection and, upon the designation of a bookmarked image, the spatial bearing parameter may be transmitted to a remote location. In one embodiment, control signals for aiming the video-camera along a LOS may be transmitted from the near location along with the spatial bearing parameter (e.g., the spatial bookmark may be transmitted from the near location).

In various embodiments, the method steps described herein, including the method steps described in FIG. 4, may be performed in an order different from the particular order described or shown. In other embodiments, other steps may be provided, or steps may be eliminated, from the described methods.

In addition to the preceding examples, the embodiments herein also may be utilized with respect to other applications. For example, a spatial bookmark may be utilized in robotic applications such as directing a mobile tele-presence robot to return to a particular physical space. A robot may navigate to a location, such as a location within an office, and create a spatial bookmark for the location. The spatial bookmark may then be stored and presented to a user such that, upon selection by a user, the robot can be directed to return to the bookmarked location from a different location.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 4. Certain steps of the methods described herein, including one or more of the steps of FIG. 4, may be performed by a server or by another processor in a network-based cloud-computing system. Certain steps of the methods described herein, including one or more of the steps of FIG. 4, may be performed by a client computer in a network-based cloud computing system. The steps of the methods described herein, including one or more of the steps of FIG. 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
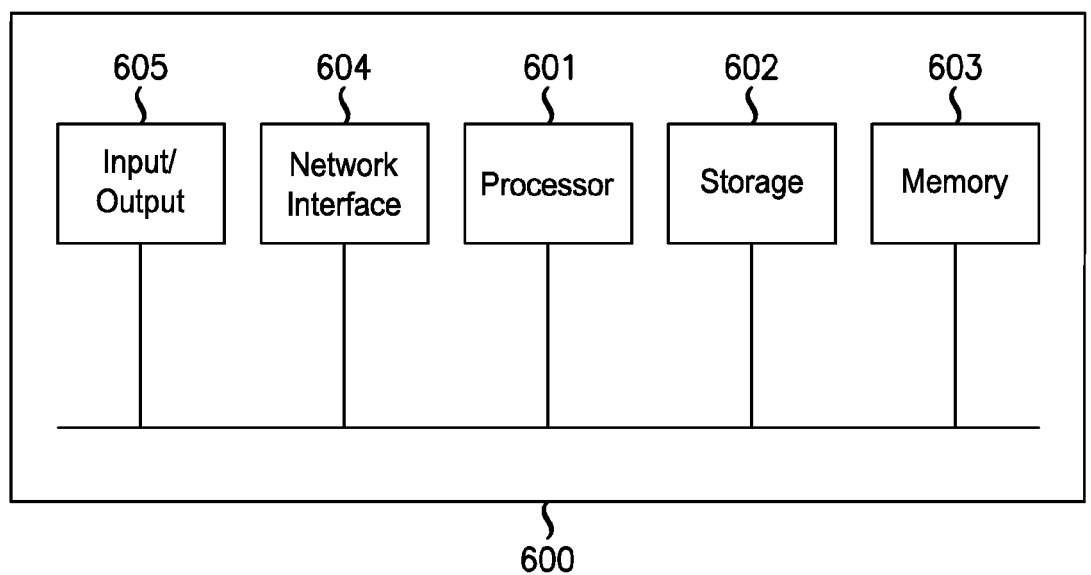
FIG. 6 is a high-level block diagram of an exemplary computer for creating and utilizing a spatial bookmark within a networked computing platform.

A high-level block diagram of an exemplary computer that may be used to implement systems, apparatus and methods described herein is illustrated in FIG. 6. Computer 600 includes a processor 601 operatively coupled to a data storage device 602 and a memory 603. Processor 601 controls the overall operation of computer 600 by executing computer program instructions that define such operations. The computer program instructions may be stored in data storage device 602, or other computer readable medium, and loaded into memory 603 when execution of the computer program instructions is desired. Thus, the method steps of FIG. 4 can be defined by the computer program instructions stored in memory 603 and/or data storage device 602 and controlled by the processor 601 executing the computer program instructions. For example, the computer program instructions can be implemented as computer executable code programmed by one skilled in the art to perform an algorithm defined by the method steps of FIG. 4. Accordingly, by executing the computer program instructions, the processor 601 executes an algorithm defined by the method steps of FIG. 4. Computer 600 also includes one or more network interfaces 604 for communicating with other devices via a network. Computer 600 also includes one or more input/output devices 605 that enable user interaction with computer 600 (e.g., display, keyboard, mouse, speakers, buttons, etc.).

Processor 601 may include both general and special purpose microprocessors, and may be the sole processor or one of multiple processors of computer 600. Processor 601 may include one or more central processing units (CPUs), for example. Processor 601, data storage device 602, and/or memory 603 may include, be supplemented by, or incorporated in, one or more application-specific integrated circuits (ASICs) and/or one or more field programmable gate arrays (FPGAs).

Data storage device 602 and memory 603 each include a tangible non-transitory computer readable storage medium. Data storage device 602, and memory 603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 605 may include peripherals, such as a printer, scanner, display screen, etc. For example, input/output devices 605 may include a display device such as a cathode ray tube (CRT), liquid crystal display (LCD) monitor or projector for displaying information to the user, a keyboard, and a pointing device such as a mouse, a trackball or a camera including image processing by which the user can provide input to computer 600.

Any or all of the systems and apparatus discussed herein may be implemented using a computer such as computer 600.

One skilled in the art will recognize that an implementation of an actual computer or computer system may have other structures and may contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of this disclosure. Those skilled in the art could implement various other feature combinations without departing from the scope and spirit of this disclosure.

We claim:

1. A method comprising:
   performing an action at a near location to specify an angular range of motion of a video camera platform and a number of divisions within the angular range of motion;
   performing an action at the near location which causes at least one spatial bookmark, each comprising a spatial bearing parameter, corresponding to a real-time video image captured by the video-camera platform at a remote location, to be stored in a computer-readable memory, the video-camera platform having a controllable line-of-sight (LOS), wherein the at least one spatial bookmark is automatically created by the video-camera platform based on a scan of the specified angular range of motion and the specified number of divisions to provide a spatial bookmark for each of the divisions;
   performing an action at the near location that designates to a computer an image displayed on a screen, wherein the image is representative of the real-time video image, thereby causing the computer to retrieve one of the at least one spatial bookmark from the computer-readable memory; and
   performing an action causing the computer to aim the video-camera platform along a LOS corresponding to the one of the at least one spatial bookmark, wherein the video-camera platform captures a real-time video image that is received at a screen for display at the near location.

2. The method of claim 1, wherein the video-camera platform is in communication with a robotic device at the remote location, and wherein performing the action causing the computer to aim the video-camera platform along the LOS causes the robotic device to perform an action based on a real-time video image captured by the video-camera platform along the LOS.

3. The method of claim 1, wherein the video-camera platform is in communication with a computer application, and wherein performing the action causing the computer to aim the video-camera platform along the LOS causes the computer application to perform an action based on a real-time video image captured by the video-camera platform along the LOS.

4. The method of claim 1, wherein the spatial bearing parameter comprises at least one of a pan coordinate and a tilt coordinate.

5. The method of claim 1, further comprising automatically determining the at least one spatial bookmark based on one of a detected sensor signal at the remote location or user-selected scanning criteria.

6. The method of claim 1, wherein the image is one of a computer display icon and a representation of a real-time video image of the video-camera platform.

7. The method of claim 1, further comprising one of:
causing information indicative of the at least one spatial bookmark to be stored in the computer-readable memory; and
causing the information indicative of the one of the at least one spatial bookmark to be transmitted, wherein the information indicative of the one of the at least one spatial bookmark causes the video-camera platform to aim along a LOS corresponding to the one of the at least one spatial bookmark.

8. The method of claim 1, further comprising:
upon user-selection, storing an index of information indicative of the at least one spatial bookmark and transmitting the index along with an instruction to record the at least one spatial bookmark; and
upon the designation of the image, transmitting the index that corresponds to the at least one spatial bookmark to the remote location.

9. The method of claim 1, further comprising:
upon user-selection, storing the at least one spatial bookmark at the near location; and
upon the designation of the image, transmitting the at least one spatial bookmark to the remote location.

10. The method of claim 1, further comprising transmitting, from the near location, control signals for aiming the video-camera platform along the selected LOS.

11. A method comprising:
displaying, at a near location, real-time video images captured by a video-camera platform at a remote location, the video-camera platform having a controllable line-of-sight (LOS);
receiving one or more user-generated inputs at respective view-selection times while displaying the real-time video images, wherein the one or more user-generated inputs specify an angular range of motion of the video camera platform and a number of divisions within the angular range of motion;
recording at least one spatial bookmark, each comprising a spatial bearing parameter of the video-camera platform, obtained at each respective view-selection time in response to the respective user-generated inputs, wherein the at least one spatial bookmark is automatically created by the video-camera platform based on a scan of the specified angular range of motion and the specified number of divisions to provide a spatial bookmark for each of the divisions;
displaying images representative of the real-time video images at each view-selection time; and
automatically aiming the video-camera platform along a LOS corresponding to one of the at least one spatial bookmark in response to at least one user-generated input that designates a selected one of the images representative of the real-time video images.

12. The method of claim 11, wherein the one or more user-generated inputs comprise one of a mouse click or a touch-sensitive screen touch.

13. The method of claim 11, wherein the images representative of the dynamic view comprise one of computer display icons or miniature, static screen captures of selected video-camera platform views.

14. The method of claim 11, wherein the dynamic view captured by the video-camera platform is displayed in real-time.

15. The method of claim 11, wherein automatically aiming comprises transmitting a message to the remote location that causes the video-camera platform to be aimed along the recorded LOS corresponding to the selected one of the images.

16. A non-transitory computer-readable medium having computer program instructions stored thereon, which, when executed on a processor, cause the processor to perform a method comprising:
performing an action at a near location to specify an angular range of motion of a video camera platform and a number of divisions within the angular range of motion;
performing an action at the near location which causes at least one spatial bookmark, each comprising a spatial bearing parameter, corresponding to a real-time video image captured by the video-camera platform at a remote location, to be stored in a computer-readable memory, the video-camera platform having a controllable line-of-sight (LOS), wherein the at least one spatial bookmark is automatically created by the video-camera platform based on a scan of the specified angular range of motion and the specified number of divisions to provide a spatial bookmark for each of the divisions;
performing an action at the near location that designates to a computer an image displayed on a screen, wherein the image is representative of the real-time video image, thereby causing the computer to retrieve one of the at least one spatial bookmark from the computer-readable memory; and
performing an action causing the computer to aim the video-camera platform along a LOS corresponding to the one of the at least one spatial bookmark, wherein the video-camera platform captures a real-time video image that is received at a screen for display at the near location.

17. An apparatus comprising:
a screen configured to display, at a near location, real-time video images captured by a video-camera platform at a remote location, the video-camera platform having a controllable line-of-sight (LOS);
an input/output interface configured to receive one or more user-generated inputs at respective view-selection times while displaying the real-time video images, wherein the one or more user-generated inputs specify an angular range of motion of the video camera platform and a number of divisions within the angular range of motion;
a processor, in communication with a computer-readable memory, configured to record at least one spatial bookmark, each comprising a spatial bearing parameter of the video-camera platform, obtained at each respective view-selection time in response to the respective user-generated inputs, wherein the at least one spatial bookmark is automatically created by the video-camera platform based on a scan of the specified angular range of motion and the specified number of divisions to provide a spatial bookmark for each of the divisions;

the screen configured to display images representative of the real-time video images at each view-selection time; and the processor configured to automatically aim the video-camera platform along a LOS corresponding to one of the at least one spatial bookmark in response to at least one user-generated input that designates a selected one of the images representative of the real-time video images.

\* \* \* \* \*